June 8, 1937.   J. BIJUR   2,082,786
CENTRAL LUBRICATING SYSTEM
Filed Dec. 5, 1928   3 Sheets-Sheet 2
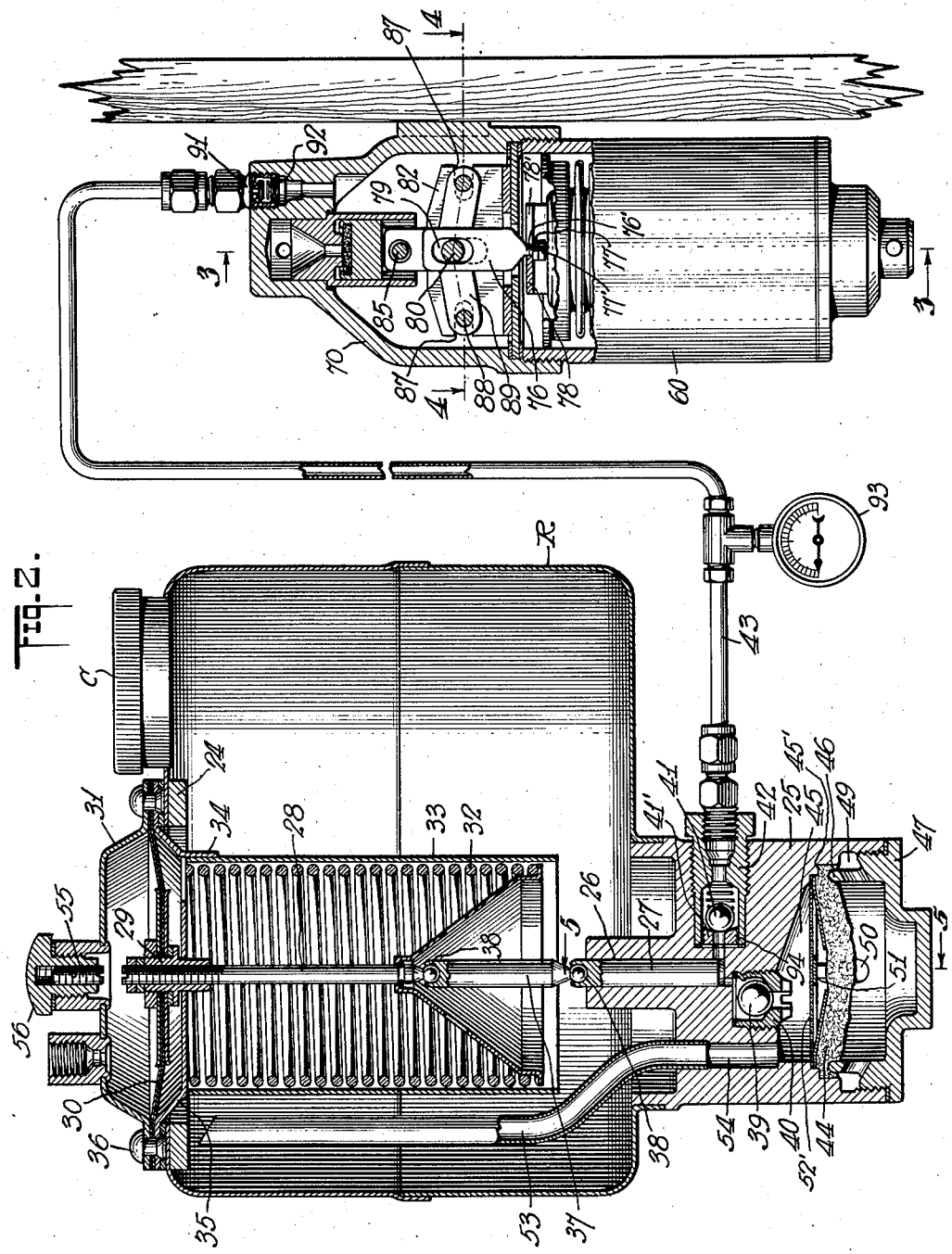
INVENTOR
Joseph Bijur
BY
Dean, Fairbank, Obrieghts & Hirsch
his ATTORNEYS.

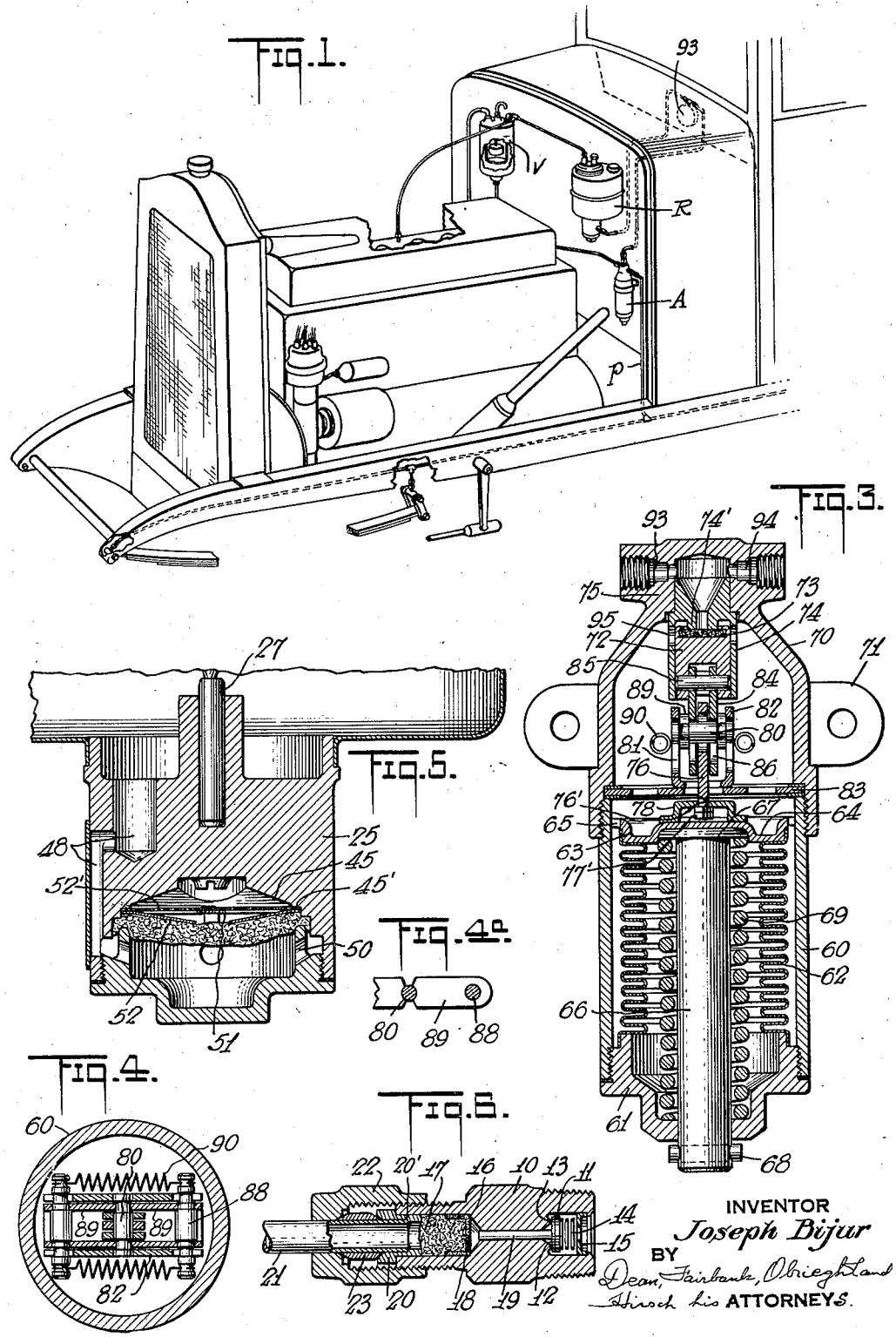

June 8, 1937. J. BIJUR 2,082,786
CENTRAL LUBRICATING SYSTEM
Filed Dec. 5, 1928 3 Sheets-Sheet 3
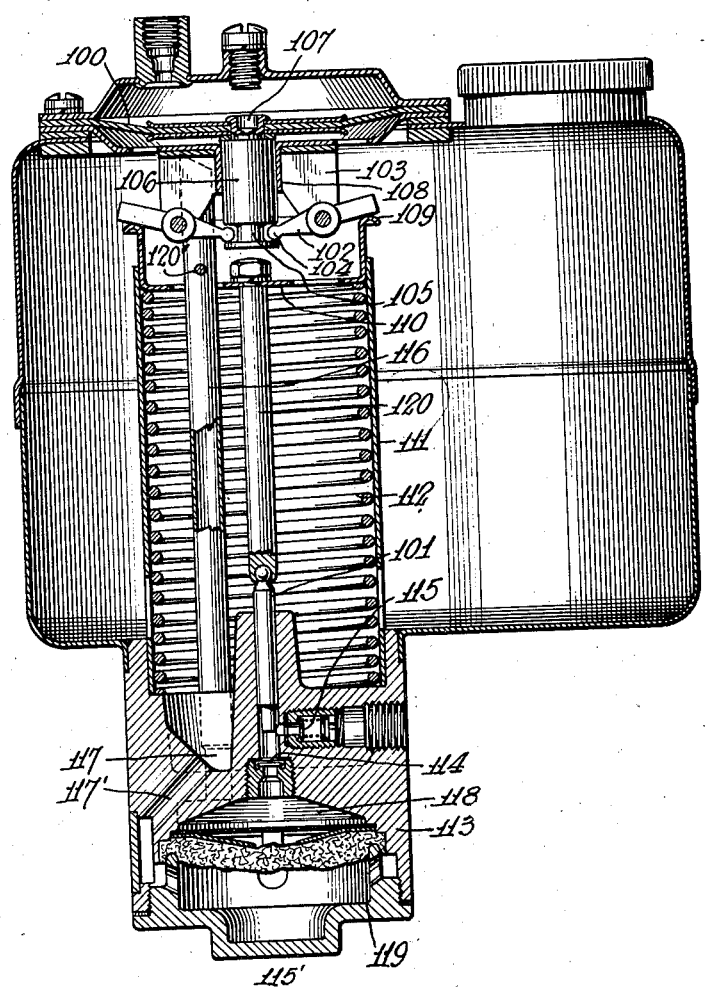
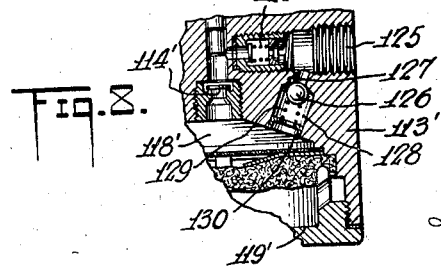
INVENTOR
Joseph Bijur
BY
his ATTORNEYS.

Patented June 8, 1937

2,082,786

UNITED STATES PATENT OFFICE 2,082,786

CENTRAL LUBRICATING SYSTEM

Joseph Bijur, New York, N. Y., assignor to Auto Research Corporation, a corporation of Delaware Application December 5, 1928, Serial No. 323,867

25 Claims. (Cl. 184—7)

My present invention is concerned with liquid distribution and while it has a preferred application to automobile chassis lubrication, it is also applicable to the lubrication of other mechanisms and installations.

It is among the objects of the invention to provide a lubricant supply installation, the action of which may be entirely automatic, without the need for manual control, to deliver a sufficiency, yet no excessive over-supply, of lubricant to a distributing system that leads to a multiplicity of bearings.

Another object is to provide an installation of the above type, which will operate with uniform effectiveness, regardless what the distribution or the relative level of the bearings or the diverse lubricant requirements thereof, or the varying temperature or viscosity of the oil, or the violence of vibration to which the parts are subjected in use.

Another object is to provide an arrangement which enables utilization of a variable pressure source to supply a system designed to receive lubricant pressure which must exceed a predetermined minimum.

Another object is to provide an arrangement which enables utilization of a continuously or frequently energized pressure source to supply lubricant to a system designed to receive lubricant in relatively infrequent shots.

Although the present invention is broadly adapted to supply lubricant automatically to various distributing systems, it is particularly adapted for supplying a distributing system of the character shown and described in my prior Patent No. 1,632,771, particularly where the metering outlets of such a system have check or nonreturn valves seated by springs of substantial strength.

A system provided with valved outlets of this character receives lubricant at a pressure substantially above the seating pressure of said valves, so that all valves shall be opened simultaneously upon said pressure applications as otherwise an undesirable distribution will take place through those valves seated with slightly weaker springs to the deprivation of the remaining outlets.

A feature of the present invention resides in associating with an automatic pressure creating device or pump, actuated continuously or at frequent intervals to yield a variable lubricant pressure, an arrangement which accumulates lubricant and energy and assures that such lubricant and energy will be delivered in intermittent shots at a predetermined pressure to a lubricant distributing system.

Specifically, the delivery to the accumulator is effected by a supply pump, which may be of any desired type, and is preferably associated in a unitary construction with a supply reservoir. The pump is actuated by energy derived from the engine or in the normal progress of the vehicle, and the accumlator is charged from said pump not only with lubricant, but with the energy by which said accumulator is subsequently discharged into the distributing system. Preferably, the accumulator is so constructed that after a substantial, preferably a predetermined volume of lubricant has been stored therein, its outlet is automatically sprung open, as, for instance, by a toggle operated valve, to cause discharge into the distributing system, and said outlet closes preferably by a snap action only after the accumulator discharge has been completed.

While the pump that charges the accumulator may be energized in any of a wide variety of different ways, I have shown such pump energized from the course of mixture flow in the engine, illustratively by suction from the engine manifold.

Under average conditions the vacuum fuel feed tank operates a certain number of times per mile, and this relative regularity of operation is utilized for corresponding regularity in the operation of the lubricant pump. In the absence of a vacuum fuel feed system, the lubricant pump diaphragm may be operated directly from the intake manifold. The substantial rise and fall of vacuum due respectively to throttling and accelerating are utilized for effective substantially metered pump operation.

Thus, the total charge metered over any period of time may be regulated by the stroke adjustments of the pump and in the case of the manifold operated embodiment also by the adjustments between a resilient opposition to the pump charging and/or discharging and the degree of vacuum, while the accumulator determines the magnitude of, or the intervals between individual shots of lubricant into the system.

A feature of the invention resides in the use of a filter to prevent any solid particles in the lubricant from interfering with the perfect closure of the pump valves and entering the distributing system. The lubricant is preferably delivered from the reservoir to a chamber below the filter and said filter may be resiliently mounted so that it can yield or belly toward the pump on the charging stroke thereof and then move during the intervals between suction pulls in the opposite direction ensuring passage of oil therethrough.

Indicating means is preferably employed to apprise the user of the need for replenishing the primary supply of chassis lubricant which may take the form of a pressure gauge permanently connected in the line that delivers from the supply pump to the accumulator. In this section of the line, the pressure would never fall if the valves at each end happened to be perfectly tight, so there is introduced a bleeder to allow the oil in this section to leak back slowly into the pump and supply therefor. Thus when pumping ceases, the gauge shows a slow fall of pressure and eventually little or no pressure. When the pumping again commences the gauge will quickly come up to its ordinary working value and hold that indication when operation continues, unless the oil supply is exhausted, in which case the gauge will remain at or near zero, apprising the user of the need for refilling.

Where the pump discharge is effected by positive means or by resilient means capable of exerting oil pressure higher than that for which the accumulator is intended, then to prevent such excessive pressure, a safety valve is introduced between the pump and the accumulator. Preferably the safety valve is adjacent to or at the pump and discharges back into the reservoir.

In the accompanying drawings in which are shown one or more of various possible embodiments of the several features of this invention, Fig. 1 is a perspective view under an engine hood indicating a desirable installation of the system, Fig. 2 is a detail sectional view indicating a desirable form of reservoir, pump and accumulator, and the relative position of the parts, Fig. 3 is a longitudinal cross-sectional view taken on line 3—3 of Fig. 2, Fig. 4 is a transverse sectional view taken on line 4—4 of Fig. 2, Fig. 4a is a fragmentary detail view of the toggle, Fig. 5 is a longitudinal cross-sectional view taken on line 5—5 of Fig. 2, Fig. 6 is a longitudinal section through a preferred form of drip plug, useful in the present system, Fig. 7 is a view in longitudinal cross-section of an alternative form of supply pump or reservoir, and Fig. 8 is a fragmentary view of a modification.

In Fig. 1 are diagrammatically shown mounted on the dashboard, a lubricant reservoir and pump unit R connected to an accumulator unit A, both of said units shown in detail in Fig. 2. The pump is operated by the alternate suction and trip operations of the tank V, of a vacuum fuel feed system of well known type. The accumulator A discharges through pipe $p$ to the distributing system, extending along various structural parts of the vehicle and delivering through drip plugs to the various bearings.

While the distributing system is substantially like that of the prior Patent No. 1,632,771 I have illustratively shown in Fig. 6 a simple drip plug construction, preferred in many relations. The drip plug illustratively comprises a fitting 10 having a valve 11 with a seating facing 12 of varnished silk and urged against seat 13 in the fitting by a coil compression spring 14 reacting against a retaining cup 15. Plugged into socket 16 at the opposite end of the fitting is a strainer 17 of wool felt having a backing 18 of wire mesh. Between the valve and the strainer is the restriction pin 19 fitting in a corresponding longitudinal bore in the fitting. The resistance of the drip plug depends on the precise diameter of wire 19, in the bore of uniform diameter, affording drip plugs of different calibration, each of which preferably has a marking (not shown) indicating its rating. At the inlet of the fitting is a hardened steel bushing 20 preferably press-fitted, and retaining the strainer 17 in place. A threaded bushing 22 reacts at its inner end against a compression coupling sleeve 23 wedged inward by the hardened sleeve 20 against the feed-pipe 21 therethrough, the extremity of said pipe abutting shoulder 20' in sleeve 20.

The pump is shown in Fig. 2 as a unitary part with the reservoir R. A casting 25 at the bottom of the sheet metal reservoir R has a vertical cylinder bore 26 therein, within which extends piston 27. The piston is operated by a connecting rod 28 attached by clamping nuts 29 at the upper end thereof to the middle of diaphragm 30, which is peripherally clamped in a capsule comprising a pair of cups 31 and 35 riveted together at 36. A coil spring 32 of large diameter is housed within a sheet metal cartridge 33 in the reservoir, said cartridge being secured as by soldering to tongues 34 turned down from the capsule cap 35. The assembly of diaphragm, capsule, spring cartridge and piston is secured to the reservoir by resting the rim of the capsule on top of the reservoir, with the cartridge protruding thereinto, and securing said rim by screws (not shown) threaded into a backing ring 24 welded to the reservoir. In order to avoid mis-alignment or jamming, of the piston 27, a link 37 is interposed between the stem 28 and the piston 27 and is connected thereto by a ball and socket joint 38 at each end thereof.

The pump has an inlet valve below the cylinder including a ball 39 seated by gravity into a screw fitting 40, and an outlet valve 41 spring-pressed against a seat 41' in a fitting 42, to which the feed pipe 43 is connected. The parts are so related, as shown, as to afford a minimum volume between the closed inlet valve 39, the closed outlet valve 41 and the piston 26, so that the suction exerted by the piston 27 shall be effective, the pump being nearly voidless. A filter 44 is peripherally clamped against shoulders 45' in the cavity 45 of the casting 15 by the flange 46 of a screw cup 47. A passage 48 drains from the reservoir bottom to the annular space 49 above flange 46, from which the oil passes under filter 44 through perforations 50. A sheet metal plate 51 is interposed between the upper surface of the filter and the shoulder 45' and has spring tongues 52 normally maintaining the felt deflected downward, as shown. A metal screen 52' is preferably superposed over plate 51. A vent pipe 53 is connected into the upper end of a bore 54 communicating with the cavity 45, and terminates near the top of the casing, the casing being vented through an aperture (not shown) through the filling cap C. Stop screw 55 is threaded into a removable screw plug 56 and is adjustable therein, to adjust the stroke or volume of the pump.

In sustained suction on the vacuum tank, the diaphragm 30 will flex upward until stem 28 strikes stop screw 55, raising the piston 27, stressing spring 32 and drawing a charge of lubricant from above the filter 44 past the inlet valve 39. The suction thus created will flex the filter 44 upward from its downwardly sagging normal form. When in the course of operation, the vacuum tank trips, as it will ordinarily, approximately every tenth of a mile, the suction on the surface of the diaphragm 30 is relieved and the spring 32 in its expansion will force the piston downward and open the outlet valve 41 and discharge into the pipe 43. As the suction is thus relieved, the spring fingers 52 will flex the filter 44 downward to the position shown in Figs. 2 and 5, as lubricant from therebelow seeps therethrough affording a filtered charge of lubricant for the next suction stroke of the pump. The filter thus not only prevents foreign particles from flowing with the oil into the system, but the filter also intercepts said particles from the path of flow to valves 39 and 41, of the small volume supply pump.

While for certain uses, the reservoir and pump unit described may be connected direct to a distributing system devoid of valves or utilizing suction-seated valves or valves with light springs, the present invention more particularly involves the interposition of an accumulator between the pump and the distributing system.

Referring now to Figs. 2 and 3, the accumulator unit includes a power element in cylindrical case 60 and a trip valve unit in hood case 70. The case 60 of the power unit is closed by a cap 61 to which is secured one end of a corrugated resilient flexible metal tube 62, the other end of which is secured to the flange 63 of a guide head 64, slidable at its edge 65 in the case 60. A rod 66 axially through the case 60 re-acts at its enlarged end 67 against the guide head 64 and protrudes at its opposite end through the cap 61, a cross pin 68 limiting the upward stroke of the rod 66. A strong coil spring 69 about the rod, reacts against the cap 61 and the head 67, and normally maintains the flexible tube 62 distended.

The trip valve within the hood case 70 comprises a valve plunger 72 having a soft seat facing 73, as of vellumoid, and slidable in a valve cage piece 74, pressfitted into the head 75 of the hood case. The cage piece has a valve seat 74' and lateral inlet ports 95.

The valve is operated by a toggle including a pair of transmission links 84 pinned at 85 to the valve plunger 72, and having elongated slots 86 about a control pin 80, the ends of which are slidable in slots 81 in the arms of a U-shaped bracket 82 mounted on a perforated support disk 83. The bracket arms 82 have elongated end notches 87, lodging toggle pins 88 at the outer ends of toggle links 89 pivoted to the control pin 80 and said pins 88 are pulled toward each other by a pair of tension toggle springs 90.

The power element and the trip element are operatively interconnected by means of link 76 extending between links 84 and having an elongated slot 79 through which pin 80 extends. The lower end of link 76 is greatly reduced in width and is formed as a screw stud 76' for connection of nuts 77 and 77'. After these are threaded in place, the screw stud is slid laterally through slot 78' in a dished plate 78 mounted on slide head 64. The parts have sufficient play to permit assembly in the manner described and thereupon the assembly of the accumulator is completed by screwing hood case 70 upon case 60, which clamps disk 83 in position therebetween, as shown.

The lubricant from the pump reservoir R is admitted to the accumulator cup through an inlet fitting 91 at an inlet boss 92 and the accumulator emits preferably through a pair of outlets 93 and 94 at the upper end of the accumulator and which lead to the distributing system at opposite sides of the vehicle.

In use, each pump operation causes the delivery of a small shot of lubricant into the accumulator, correspondingly compressing the corrugated metal tube 62 and drawing down with it the slidable head 64 thereof, and sliding rod 66 downward to compress spring 69. After a series of pump discharges, the end of slot 79 engages the pin 80 and in the further movement, draws said pin downward, moving pins 88 outward in slots 87 and stressing the springs 90, until the pin 80 has been moved past the line connecting pins 88. Thereupon the toggle link snaps in the opposite direction causing pin 80 to react against the lower ends of the slots 86 in links 84, and snapping the valve 72 open to a limiting position determined by the engagement of pin 80 with the lower ends of slots 81. The stressed spring 69 now expels lubricant into the distributing system through the ports 95 uncovered by the open valve 72. The time of discharge of the accumulator depends on the effective volume thereof, the strength of the spring 69, the resistance of the drip plugs and the viscosity of the oil. Regardless, however, whether the discharge be relatively fast, with fluid oil, for instance, or slow, with viscous oil, the distribution of the effective volume of oil from the accumulator is accurately determined by the drip plugs.

In the expansion of the spring 69, as the accumulator discharges, the link 76 is returned, the lower end of its elongated slot 79 first touching pin 80 and thereafter, it snaps the toggle back to valve-closing position as shown in Fig. 3 in readiness to be again charged in the manner previously described.

The valve 72 thus remains closed throughout charge of the accumulator and throughout movement of the toggle, until the latter is snapped past dead center, when it snaps the valve open. The valve remains open throughout discharge of the accumulator and the concurrent return movement of the toggle action, until the accumulator discharge has been completed, at which time, the toggle has moved past dead center and the valve is thus snapped closed. The quick snap action is reliably controlled and unaffected even by violent vibration of the vehicle.

The effective volume of the accumulator may be readily increased if desired, by simply removing nut 77' and filing off the end of stud 76' that then projects beyond the nut 77. The increased gaps resulting between the bottom of the nut 77 and the plate 64 during the contraction of the corrugated tube 62 and between the top of the nut 77 and the bottom of the dished plate 78 during the expansion of said tube afford an increased lost motion between the movements of said bellows 62 and of the valve operating linkage 76 upon reversal which enables an increased contraction of the bellows tube 62 before the accumulator will discharge and an increased lubricant discharge.

It will be seen that the total volume discharged by the pump 27 will be more or less proportional to the fuel consumption of the vehicle, which again is more or less proportional to the requirements of the chassis bearings for lubricant. The interposition of the accumulator between the pump and the distributing system effects an integration of the small pump discharges, so that every time the accumulator operates, a substantial volume is injected into the distributing system under the substantial expansive force of its spring 69. Thus, the accumulator furnishes enough oil at one shot to supply even the fast flowing drip plug required, for instance, in prior Patent No. 1,632,771 to assure proper division in feeding oil to a plurality of steering knuckle bearings, from a single drip plug.

The accumulator hood 70 preferably has lateral tongues 71 by which it may be affixed to a dashboard or other convenient support. In the preferred vertical position shown, any air in the accumulator is naturally voided, since it is swept out with the flow of oil from the narrowed top, where it would naturally collect. The corrugated metal bellows 62 is leak-tight, so that it will respond to the successive small charges admitted to the accumulator, without any of such feed leaking, which would occur with any but a very tight piston.

The apparatus being strictly automatic in action, means is desirable to apprise the user of the need for refilling the reservoir when nearly empty. For this purpose, the fitting 91 is simply provided with a check valve 92 and a pressure responsive element, such as a gauge 93 is tapped into line 43. Valve 41 is preferably provided with a bleeder or pressure relief, for instance a fine screw thread clearance 94 between fitting 42 and seat plug 41.

In operation of the vehicle, it is apparent, that, notwithstanding the drop in pressure on the distributing system during the intervals between successive accumulator shots, the feed line 43 remains under substantial sustained pressure throughout vehicle operation. After the vehicle has come to rest and its engine is idle, the pressure in line 43 is slowly released through bleeder 94 and past the piston 27 and gauge 93 will have dropped substantially by the time the vehicle is again removed from the garage the following morning. To avoid sustained pressure after pumping has ceased, or excessively slow building up of pressure when pumping is resumed, which might occur due to trapping of air at the gauge, the pressure inlet of the latter is preferably at the top thereof as shown rather than at the bottom. Should the oil in the reservoir become nearly exhausted, the action of the pump will not cause pressure again to rise in feed line 43 after pressure has been released by bleeder 94 and the low reading of the gauge after a period of vehicle operation indicates the need for refilling. Of course instead of the gauge, an electric alarm or other indicator could be employed.

In Fig. 7 is shown a modification of pump, operable direct from the intake manifold instead of from the vacuum tank. Substantial suction is sustained in the manifold throughout normal running and throughout idling of the engine. Only during the relatively short intervals of engine acceleration immediately following the opening of the throttle is the suction materially reduced. It is therefore preferred to effect charging of the pump during the occasional brief intervals of low suction, and to utilize the periods of sustained suction for pump discharge, since the latter operation may become more difficult in cold weather due to rise in viscosity of the oil. In the specific embodiment shown, reversing linkage is introduced between the suction diaphragm 100 and the plunger 101. This reversing mechanism comprises a group, preferably two links or levers 102 centrally pivoted on brackets 103 secured to the reservoir top, having a rocking hinge mount 104 at their inner ends in a circumferential groove 105 about a hub 106 riveted at 107 centrally to the diaphragm and slidable in a bearing 108. The free ends of the levers or links 102 react against the rim 109 of a retaining collar 110. Collar 110 is slidably telescoped into the upper end of housing 111 and is connected by rod 120 to plunger 101. Housing 111 encloses spring 112 and is applied at its lower end in pump casting 113. Illustratively, I have shown in lieu of the ball valves of Fig. 2, disk valves 114 and 115.

In operation, any marked opening of the throttle is followed by decrease of suction from the manifold to allow spring 112 to expand and to lift plunger 101 for the pump charging stroke. In this operation, the spring lifts cap 110 and through links 102 and hub 106 flexes diaphragm 100 downward. As the vehicle speeds up, normal suction is again applied to diaphragm 100, which in flexing upward lifts hub 106, and through reversing links 102 depresses cup 110 against the resistance of spring 112 and with it depresses plunger 101. Inasmuch as the suction on diaphragm 100 is sustained, the diaphragm will be reliably flexed upward for complete discharge of plunger 101, regardless of the resistance imposed on the propulsion of the oil in cold weather.

Since the spring cartridge 111 is mounted in the pump base, I find it convenient in this instance to locate the vent pipe 116 therewithin, as shown, in a bore 117 communicating with the upper part of filter chamber 118 and through oblique bore 117' with the interior of the screw cup 119. A cross-pin 120' through the vent pipe 116 and above the bottom of cup 110 precludes separation of the parts under expansion of the spring 112.

While the system is disclosed as applied for automobile lubrication, it will be understood that it has a wide variety of other applications. While the pump is shown as operated from the intake manifold of the engine, any of a wide variety of sources of mechanical or heat energy or other sources of fluid pressure may also be employed. Among these are the engine exhaust, the cylinder compression, the rise or fall in the temperature of the engine cooling water or of the exhaust gases, the vibration of the vehicle, or of a part attached to or rigid therewith such as an inertia weight, the axle or the flexing vehicle spring, or a pump continuously driven from the engine.

Where the pump is mechanically driven from the engine or vehicle, and its discharge may evolve pressure greater than that for which the accumulator is intended, or where the pump has a discharge spring capable of exerting such high pressure, it is preferred to provide a safety device to prevent excess pressure. In the fragmentary view of Fig. 8, parts corresponding to those of Fig. 7 are identified by the same reference numerals primed. There is here provided a safety valve preferably within the casting 113' and between the outlet valve 115' and the outlet 125 from the pump. The safety valve may comprise a ball 126 urged against its seat 127 in an oblique bore 128 by a coil spring 129 retained in place by a cap 130.

In operation pressure on the connecting line leading from the pump to the accumulator can never rise beyond that required to unseat the safety valve 126 and thus the accumulator is protected against destructive or deranging impulse. The valve 126 relieves pressure without loss of lubricant, any oil emitted by valve 126 flowing back to cavity 118'.

The invention, however, is not intended to be restricted to any particular construction or arrangement of parts, or to any particular application of any such construction, or to any specific method of operation, or manner of use, or to any of various details thereof, herein shown and described, as the same may be modified in various particulars or be applied in many varied relations without departing from the spirit and scope of the claimed invention, the practical embodiments herein illustrated and described merely showing some of the various features entering into the application of the invention.

Having now particularly described and ascertained the nature of my said invention, and in what manner the same is to be described, I declare that what I claim is:

1. An automatic liquid distribution system as for the central lubricating installation of an automobile chassis, characterized by pumping means feeding slowly from a source of lubricant into a spring discharged accumulator from which the collected or accumulated substantial charges are discharged completely at a predetermined pressure into the distribution system, said accumulator being provided with a displacing bellows device actuated in one direction by the feed of lubricant into the accumulator and actuated in the other direction by said spring.

2. A device for enabling utilization of a variable pressure-creating device, in a system adapted to receive lubricant under a pressure above a predetermined minimum, comprising a liquid supply, a pressure-creating device of the character described receiving liquid from said supply, a spring discharged device for accumulating energy and liquid from said pressure-creating device and means for causing said last mentioned device to discharge its accumulated energy and liquid at a predetermined pressure, said last mentioned device including a bellows compressed upon charging of said last mentioned device with lubricant and expanding upon discharge of lubricant from said last mentioned device.

3. A device for enabling utilization of a frequently energized pressure-creating device in a system adapted to receive an intermittent lubricant supply under pressure, comprising a liquid supply, a pressure-creating device of the character described, a device for accumulating a predetermined charge of energy and liquid from said pressure-creating device and means to cause said accumulating device to discharge said predetermined charge of accumulated liquid as a single shot, said last mentioned device including a bellows compressed upon charging of said last mentioned device with lubricant and expanding upon discharge of lubricant from said last mentioned device.

4. A device for enabling utilization of a variable pressure-creating device in a liquid distribution system designed to receive infrequent pressure impulses above a predetermined minimum pressure, comprising a liquid supply, a pressure-creating device of the character described and a device for accumulating energy and liquid from said pressure creating device designed to discharge at relatively long intervals and at a predetermined pressure into said system, said last mentioned device including a resilient means which serves to store energy received from said first mentioned device, said last mentioned device including a bellows compressed upon charging of said last mentioned device with lubricant and expanding upon discharge of lubricant from said last mentioned device.

5. In a lubricating installation, a lubricant supply, a pump receiving lubricant from said supply, a device for accumulating energy and lubricant from said pump and a distributing system supplied with shots of lubricant intermittently from said accumulating device, said accumulating device including a casing with an inlet port and exit port, a valve for closing said exit port, means for closing the valve during the charging operation and opening it during the discharge operation and a spring stressed in the accumulating operation of the device and exerting pressure forcing lubricant into said system from said device during discharging operation of said device, said last mentioned device including a bellows compressed upon charging of said last mentioned device with lubricant and expanding upon discharge of lubricant from said last mentioned device.

6. In a lubricating installation, a lubricant supply, a pump, a distribution system and an accumulator for receiving lubricant from said pump and supplying it to said system, said accumulator comprising a power mechanism including a longitudinal vertical casing, stressed to cause the charging and released during the discharging operations, an outlet port at the highest point of said casing and a valve associated with said outlet port to establish communication between the accumulator and the system during discharging operation thereof and to close it during charging operation thereof, said valve being actuated by said power mechanism.

7. In a lubricating installation, a lubricant supply, a pump, a distribution system and an accumulator for receiving lubricant from said pump and supplying it to said system, said accumulator comprising a power mechanism including a deformable bellows member and a resilient member adapted to be respectively deformed and stressed during the charging of the accumulator and reformed and released to cause the discharging of the accumulator and means actuated by said power mechanism for opening the accumulator to said system at the beginning of the discharging operation and closing it at the beginning of the charging operation.

8. In a lubricating installation, a lubricant supply, a pump, a distribution system and an accumulator for being charged with lubricant from said pump and supplying it to said system, said accumulator comprising a valve, an inlet from the accumulator to the system controlled by said valve to establish communication between said accumulator and the system after its charging operation and a power mechanism actuating said valve and including a corrugated metal diaphragm casing enclosed within said accumulator and a coil spring enclosed within said casing, said coil spring normally maintaining said casing in extended position but permitting collapse of said casing when stressed under pump pressure.

9. In combination with an automotive vehicle, a lubricant supply, a distribution system, a pump connected with said supply and actuated by operation of the motor vehicle to create frequent lubricant pressure impulses and a bellows accumulator for integrating said pressures and transferring them to the distributing system at relatively long intervals.

10. In a lubricating installation for an automotive vehicle with a source of varying fluid pressure, a lubricant supply, a distribution system, a pump actuated from said source and a bellows accumulator energized by said pump for integrating the pump discharge over a relatively long period and for discharging it into said system over a relatively short period.

11. In a lubricating installation for an automotive vehicle including a source of varying fluid pressure, a lubricant supply, a distribution system, and an arrangement for transferring lubricant under pressure from said supply to said system, said arrangement comprising three reciprocating devices, which operate each other in succession, the first consisting of a diaphragm motor and being operated directly from said source, the second serving to charge the third and the third serving to discharge to the system, the lubricant flowing to the second device from the supply, from the second to the third device and from the third device to the system.

12. In a lubricating installation for an automotive vehicle including a source of varying fluid pressure, a lubricant supply, a distribution system, and an arrangement for transferring lubricant under pressure from said supply to said system, said arrangement comprising three reciprocating devices consisting in succession of a diaphragm motor, a plunger pump mechanism and a discharge device provided with a diaphragm reciprocating in one direction when said device receives a charge and reciprocating in the other direction when said device discharges, said motor actuated from said source and by mechanical connection actuating said mechanism and said device being actuated by lubricant pressure from said mechanism and discharging at intervals into said system, said mechanism and said device being each associated with resilient means stressed during the charging thereof and released to cause discharging thereof.

13. In a lubricating installation for an automotive vehicle including an intake manifold, a lubricant supply, a distributing system, and a pumping arrangement for transferring lubricant from said supply to said system, said arrangement comprising a diaphragm motor, a plunger pump positioned below said motor and a mechanical connection between said motor and said pump serving to convert a movement of the diaphragm into a movement of the plunger in an opposite direction to the movement of the diaphragm.

14. A pressure-creating arrangement comprising a liquid reservoir, a pump provided with a piston and inlet and outlet ports and a flexible filter through which liquid must pass from said reservoir to said inlet port and means to move said flexible filter toward the inlet port when the pump is charging and away from the inlet port when the pump is discharging.

15. A lubricant pressure-creating arrangement comprising a reservoir for the lubricant, a pumping arrangement within said reservoir including a piston and a cylinder with inlet and outlet ports, a felt filter and a chamber between said felt filter and said inlet port through which all lubricant must pass on its way to the pump and serving to contain a convenient supply of filtered lubricant for the pump and resilient means associated with said felt filter bellying it outwardly between suction strokes of the pump and permitting it to be sucked inwardly during suction strokes thereof.

16. A pressure creating arrangement for a lubricating system comprising a liquid reservoir, an actuating device attached to the top of said reservoir, a pump mechanism positioned at the bottom of said reservoir directly below said actuating device and a mechanical connection extending through said reservoir from said device to said mechanism, said mechanism comprising a plunger, a cylinder block provided with a pump intake chamber adjacent the lower part thereof, a passageway downwardly from the reservoir to the chamber, and a horizontally disposed felt filter dividing said intake chamber into upper and lower compartments, said upper compartment communicating directly with the cylinder and said lower compartment receiving lubricant directly from the reservoir.

17. A lubricant pressure operated measuring device for lubricant distributing installations comprising a casing with an inlet and an outlet, said inlet and outlet being both positioned at the top of the device, said device receiving lubricant pressure through said inlet, a valve associated with said outlet and a toggle mechanism to open and close said valve actuated by the accumulation of a charge within said casing and discharge thereof, respectively.

18. A lubricant pressure operated spring discharged measuring device for lubricant distributing installations comprising a casing with an inlet and an outlet, said inlet and outlet being both positioned at the top of the device, said device receiving lubricant pressure through said inlet, a valve associated with said outlet, a trip mechanism adapted to open and close said valve and a power unit energized by said lubricant pressure to actuate said trip mechanism.

19. A lubricant pressure operated measuring device for lubricant distributing installations comprising a casing with an inlet and an outlet, said device receiving lubricant pressure through said inlet, a valve associated with said outlet, a corrugated metal tube within said casing contracted by the admission of lubricant, a resilient member stressed by the contraction of said tube and tending to restore it to normal condition and a trip mechanism actuated by the contraction and expansion of said tube, in turn actuating the valve to open and close it.

20. In a lubricating system, a source of lubricant, a pump adapted to receive lubricant from said source, and an accumulator device adapted to receive and retain a plurality of charges of lubricant from said pump and discharge each of said charges under pressure into the system, said pump and said accumulator device being provided with independent casings and being substantially spaced from each other, and a connecting conduit therebetween provided with a valve at the pump and at the accumulator device.

21. In a lubricating system, a source of lubricant, a pump adapted to receive lubricant from said source, an accumulator device adapted to receive and retain a plurality of charges of lubricant from said pump, and means for discharging the lubricant from the accumulator when a predetermined quantity is stored in the accumulator, said pump and said accumulator device being provided with independent casings and being substantially spaced from each other, and a connecting conduit therebetween provided with a valve at the pump and at the accumulator device.

22. In a lubricating system, a source of lubricant, a pump adapted to receive lubricant from said source, an accumulator device adapted to receive and retain a plurality of charges of lubricant from said pump, and means for discharging the lubricant from the accumulator when a predetermined pressure of lubricant in the accumulator is reached, said pump and said accumulator device being provided with independent casings and being substantially spaced from each other, and a connecting conduit therebetween provided with a valve at the pump and at the accumulator device.

23. In a lubricating system, a source of lubricant, a pump adapted to receive lubricant from said source, an accumulator device adapted to receive and retain a plurality of charges of lubricant from said pump, and control devices for supplying lubricant to individual bearings and adapted to intermittently receive lubricant from the accumulator device, said pump and said accumulator device being provided with independent casings and being substantially spaced from each other, and a connecting conduit therebetween provided with a valve at the pump and at the accumulator device.

24. In a lubricating system a source of lubricant, a pump adapted to receive lubricant from said source, an accumulator device adapted to receive and retain a plurality of charges of lubricant from said pump, means for discharging the lubricant from the accumulator when a predetermined quantity is stored in the accumulator, and control devices for supplying lubricant to individual bearings and adapted to intermittently receive lubricant from the accumulator device, said pump and said accumulator device being provided with independent casings and being substantially spaced from each other, and a connecting conduit therebetween provided with a valve at the pump and at the accumulator device.

25. In a lubricating system, a source of lubricant, a pump adapted to receive lubricant from said source, an accumulator device adapted to receive and retain a plurality of charges of lubricant from said pump, means for discharging the lubricant from the accumulator when a predetermined pressure of lubricant in the accumulator is reached, and control devices for supplying lubricant to individual bearings and adapted to intermittently receive lubricant from the accumulator device, said pump and said accumulator device being provided with independent casings and being substantially spaced from each other, and a connecting conduit therebetween provided with a valve at the pump and at the accumulator device.

JOSEPH BIJUR.